(12) United States Patent
Simon et al.

(45) Date of Patent: Mar. 23, 2010
(10) Patent No.: US 7,682,642 B2

(54) RESISTANT STARCH COMPOSITIONS

(75) Inventors: Jacques Georges Denis Cenere Simon, Issy-les-Moulineaux (FR); Jozef Guido Roza Vanhemelrijck, Meise (BE)

(73) Assignee: Cerestar Holding B.V., La Sas Van Gent (NL)

( * ) Notice: Subject to any disclaimer, the term of this patent is extended or adjusted under 35 U.S.C. 154(b) by 855 days.

(21) Appl. No.: 10/561,296

(22) PCT Filed: Jun. 16, 2004

(86) PCT No.: PCT/EP2004/006480

§ 371 (c)(1),
(2), (4) Date: Sep. 19, 2006

(87) PCT Pub. No.: WO2005/000904

PCT Pub. Date: Jan. 6, 2005

(65) Prior Publication Data

US 2007/0059431 A1 Mar. 15, 2007

(30) Foreign Application Priority Data

Jun. 27, 2003 (EP) .................................. 03254097

(51) Int. Cl.
*A23L 1/035* (2006.01)

(52) U.S. Cl. .................... 426/549; 426/72; 426/74; 426/521; 426/656

(58) Field of Classification Search ............ 426/74, 426/620, 615, 640, 639, 658, 549, 601, 72, 426/656, 521
See application file for complete search history.

(56) References Cited

U.S. PATENT DOCUMENTS

| 3,386,889 | A | * | 6/1968 | Moses et al. ............... 435/83 |
| 4,671,966 | A |   | 6/1987 | Giddey et al. |
| 5,292,723 | A |   | 3/1994 | Audry et al. |
| 5,470,839 | A | * | 11/1995 | Laughlin et al. ............ 514/53 |

FOREIGN PATENT DOCUMENTS

| EP | 0 012 465 | 6/1980 |
| WO | WO 95/28849 | 11/1995 |

* cited by examiner

*Primary Examiner*—Helen F Pratt

(57) ABSTRACT

Process for sterilising a resistant starch composition comprising: (a) dispersing said resistant starch composition in oil; (b) heating the starch/oil dispersion obtained in step (a) to a target temperature of 100 to 175° C., preferably about 150° C.; and (c) cooling the starch/oil dispersion; sterilised resistant starch obtained by this process and uses thereof.

31 Claims, 2 Drawing Sheets

RESISTANT STARCH COMPOSITIONS

CROSS-REFERENCE TO RELATED APPLICATIONS

This application is a National Stage application under 35 U.S.C. §371 and claims benefit under 35 U.S.C. §119(a) of International Application No. PCT/EP2004/006480 having an International Filing Date of Jun. 16, 2004, which claims the benefit of priority of European Application No. EP 03254097.3 having a filing date of Jun. 27, 2003.

TECHNICAL FIELD

The present invention relates to a process for sterilising resistant starch compositions, to sterilised resistant starch compositions obtained by this process and to the use of such compositions in nutritional, pharmaceutical and feed compositions.

BACKGROUND OF THE INVENTION

It has been known for some years that a part of the starch contained in the human diet can pass the small intestine without being digested. This fraction of food starch is called resistant starch. Different forms of starch have been found to be resistant to digestion. A classification of resistant starches has been given by Englyst and Cummings (Am. J. Clin. Nutr. (1987) 45 423-431). These authors distinguish between three types of resistant starches:

Type 1: Starch which is physically inaccessible to digestive enzymes (e.g. grains and seeds);

Type 2: Raw starch granules (present in e.g. raw potato and green banana); and

Type 3: Retrograded starch (found in cooked and cooled potatoes, bread and cornflakes for example).

Because it is not enzymatically digested in the small intestine, resistant starch reaches the colon where it becomes a substrate for fermentation by the gut's anaerobic microflora. This fermentation leads to increased nitrogen fixation, to the production of gases (e.g. $H_2$, $CH_4$ and $CO_2$) and, importantly, to an increased formation of short chain fatty acids (SCFAs). The type and quantity of SCFA formed depends on the type of carbohydrate being fermented. However, the main SCFAs produced are acetate, propionate and n-butyrate.

Compared with other, less fermentable fibres such as non-starch polysaccharides, resistant starch produces a significantly greater molar quantity of n-butyrate (20-28% vs. 10-15%). This is considered important because of the major role that butyrate plays in the maintenance of a healthy digestive system. For example, butyrate is a prime substrate for energy metabolism in the colonocyte and acts as a growth factor to the healthy epithelium.

In normal cells, butyrate has been shown to induce proliferation at the crypt base, enhancing healthy tissue turnover and maintenance. In inflamed mucosa, butyrate stimulates regeneration of the diseased lining of the gut. In neoplastic cells, butyrate inhibits proliferation at the crypt surface, thus preventing the development of potential tumours. Moreover, models of experimental carcinogenesis in animals have shown butyrate's potential to modify a number of metabolic steps in the cell cycle such that early stages of cancer development may be counteracted while later stages may be slowed down. Thus, butyrate (and, by extension, resistant starch) has the potential to support the maintenance of a healthy digestive system and to reduce the risk of gut inflammation and colorectal cancer.

It is recognised that a healthy digestive system is essential to overall quality of life. The intestinal tract is indeed the organ through which nutrients that are required for growth, development and health are absorbed and through which undesired and waste substances are excreted. There has therefore been great interest by the food industry in the development of new high resistant starch products. To date, these include Actistar (Cerestar), CrystaLean (Opta Food Ingredients) and Novelose (National Starch and Chemical Company), for example.

It has now been found that products containing resistant starch could beneficially be used (instead of or in addition to other dietary fibres) in clinical nutrition. Due to the increased susceptibility of individuals in poor health and of those undergoing (or having undergone) treatment or surgery, it is important that any nutritional products administered to them be free from contamination. Food products are therefore preferably sterilised before administration. Sterilisation is usually achieved by UHT (ultra high temperature) treatment. Unfortunately, it has been found that resistant starch does not have very high thermal stability and, accordingly, that unacceptable levels are lost if submitted to high temperature sterilisation.

Methods of producing sterilised starch compositions exist in the art. However, none are suitable for the present use. In particular, none address the problem of resistant starch loss during high temperature treatment. U.S. Pat. No. 4,671,966, for example, discloses a method for the production of a thickener concentrate comprising sterilising a fatty material/starch product mix which is then emulsified with water under violent agitation and packaged. The application is not concerned with preventing starch degradation, let alone with trying to prevent the loss of resistant starch structures. Nor does the application relate to the preparation of sterile nutritional compositions. U.S. Pat. No. 4,671,966 is thus in a completely different field to that of the present invention.

FR 2686485 (Laiterie de Saint-Denis de l'Hotel) discloses a "sterilised" food composition, the ingredients of which are divided into two phases: a dry, powder phase (comprising the starch) and a sterilised, liquid phase. The two phases are packaged separately and mixed only upon use. The product can thus be stored for long periods without spoiling. However, there are several disadvantages to this method from the point of view of clinical nutrition. First, not all the ingredients are sterilised (only those comprised in the liquid phase). The risk of contamination (e.g. bacteria, moulds, etc.) is therefore not completely eliminated. In addition, the product is not ready to use. In clinical situations, it is often desirable to be able to administer nutrition directly to the patient, e.g. by enteral administration. The product described in FR 2686485 must be mixed before use and could therefore not be directly administered. This additional mixing step is not only time consuming, but it also introduces a risk of contamination which is not present when the product can be delivered straight to the patient from aseptic packaging.

FR 2636507 (Agro Investissement Developpement Aid) discloses a food composition, the ingredients of which are separated into two different categories: those which are heat-resistant and those, such as starch, which are heat-sensitive. The heat-resistant ingredients are sterilised by UHT treatment whereas the heat-sensitive ingredients are sterilised by ionisation. The two categories of ingredients are then combined in a mixing chamber and aseptically packaged. Although this method overcomes some of the problems of FR 2686485, it nonetheless has several disadvantages. First of all, it requires two types of machinery resulting in increased technical complexity and increased cost. The cost of ionisation, moreover, is relatively high, making the sterilisation procedure of FR 2636507 undesirably expensive. In addition, use of ionisation is tightly controlled and prior authorisation would therefore be required to carry out the process. This is usually difficult to obtain. Furthermore, because ionisation would have to be carried out separately, the procedure of FR 2636507 could not easily be used in a continuous production process and, therefore, on an industrial scale. The step of transferring the ionised starch powder from the ionisation device to the mixing chamber could also become a contamination risk unless carried out under strictly sterile conditions. Finally, the method of FR 2636507 relates to general starch compositions (e.g. flour) and does not consider the use of resistant starch compositions.

Consequently, there exists a clear need for an improved method of sterilising resistant starch and compositions containing resistant starch without causing unacceptable levels of denaturation. The present invention provides such a method.

SUMMARY OF THE INVENTION

According to a first aspect of the present invention, there is provided a process for sterilising a resistant starch composition comprising:

(a) dispersing said resistant starch composition in oil;

(b) heating the starch/oil dispersion obtained in step (a) to a target temperature of 100 to 175° C.; and (c) cooling the starch/oil dispersion, provided that if the resistant starch composition is granulated potato starch, the oil will be other than rapeseed oil.

Preferably, the starch/oil dispersion is heated to approximately 150° C. and step (c) is carried out immediately upon reaching this temperature.

The starch/oil dispersion preferably comprises one part resistant starch for 3-7 parts oil. Even more preferably, it comprises about one part resistant starch for about 5 parts oil. In one embodiment, an emulsifier may be added to the starch/oil dispersion before heating. The resistant starch is preferably a Type 3 resistant starch; even more preferably, it will be a maltodextrin-derived resistant starch.

According to a further aspect of the invention, there is provided a sterilised resistant starch composition obtainable by the process of the invention and the use of such a composition in a nutritional, pharmaceutical or feed composition.

Nutritional, pharmaceutical and feed compositions according to the invention may comprise up to 20% by weight, preferably up to 10% by weight, of the sterilised resistant starch composition together with one or more additional ingredients. The additional ingredients may include one or more of a protein source, a carbohydrate source, vitamins, minerals, flavourings and colorants. Preferably, the compositions are suitable for enteral administration.

According to another aspect of the present invention, there is provided a method of producing a sterile nutritional, pharmaceutical or feed composition, said method comprising:

(a) sterilising an oil dispersion comprising resistant starch and, optionally, one or more additional ingredients;

(b) sterilising a water solution comprising one or more water-soluble ingredients; and (c) combining the sterilised dispersion of step (a) and the sterilised solution of step (b), provided that if the oil dispersion of step (a) is a rapeseed oil dispersion, the resistant starch will be other than granulated potato resistant starch.

Preferably, step (c) is carried out under aseptic conditions.

In a preferred embodiment, steps (a) and (b) are carried out substantially simultaneously. Step (c) will preferably comprise combining and homogenising the sterilised dispersion of step (a) and the sterilised solution of step (b). In addition, the method may further comprise a filling step (d) wherein the sterile nutritional, pharmaceutical or feed composition is aseptically packaged.

According to yet another aspect of the present invention, there is provided a pharmaceutical composition comprising at least a sterilised resistant starch composition and a suitable carrier. The composition may be used in the treatment of intestinal problems including conditions associated with inflammation of the gastrointestinal tract, digestive disorders, colon cancers, diabetes and obesity. The invention also provides the use of a sterilised resistant starch composition in the manufacture of a medicament for use in the treatment of such disorders.

DETAILED DESCRIPTION OF THE INVENTION

Figure 1:
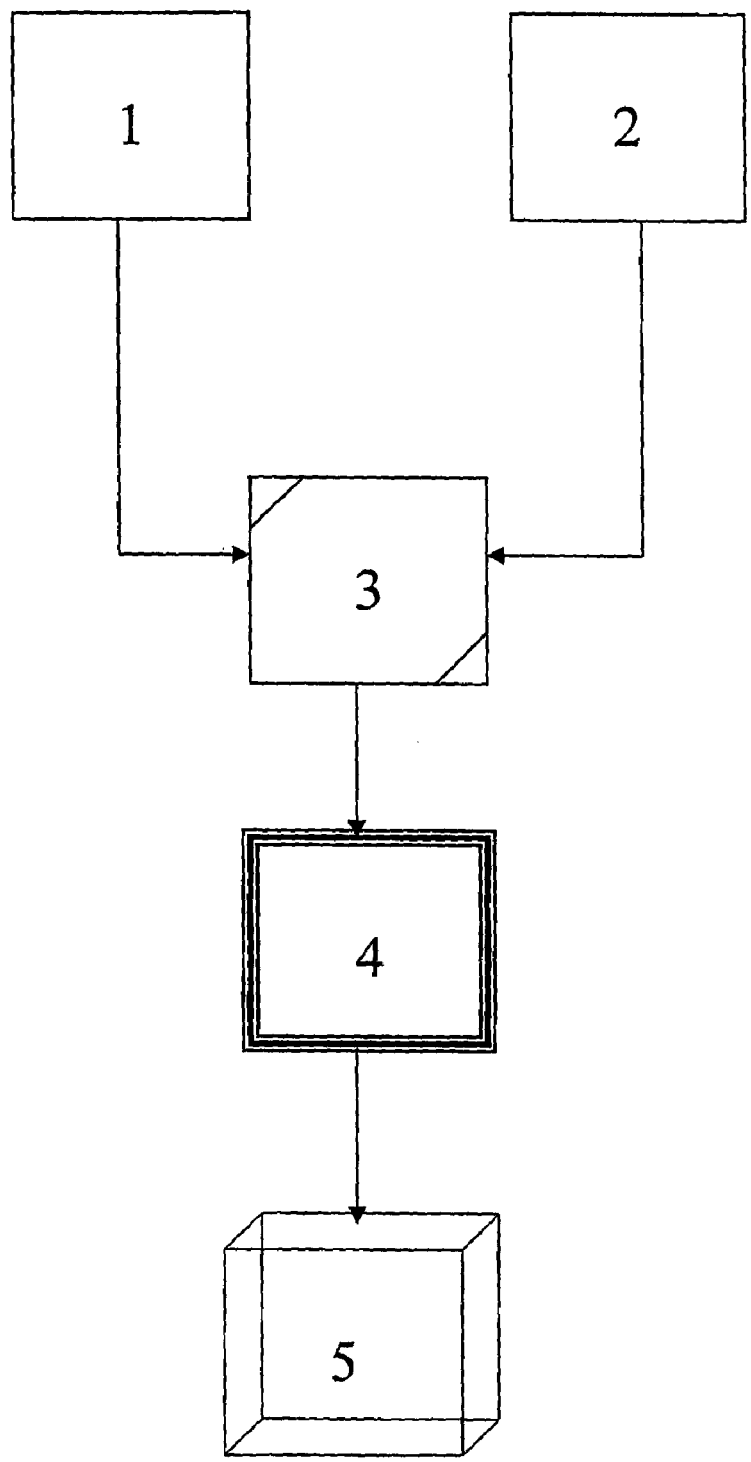
FIG. 1 is a schematic representation of the preparation, in a continuous production process, of a sterilised resistant starch composition according to the present invention wherein (1) represents an oil vessel, (2) represents a vessel for resistant starch, (3) represents a blending unit, (4) represents sterilisation apparatus and (5) represents a packaging unit.

The present invention discloses a process for sterilising resistant starch compositions comprising:

(a) dispersing said resistant starch composition in oil;

(b) heating the starch/oil dispersion obtained in step (a) to a target temperature of 100 to 175° C.; and (c) cooling the starch/oil dispersion;

provided that if the resistant starch composition is granulated potato starch, the oil will be other than rapeseed oil. Preferably, the resistant starch composition will not be granulated potato starch.

The resistant starch composition may be from any source. Advantageously, it will contain a high amount of resistant starch, i.e. at least 25% by weight, preferably at least 50% by weight, even more preferably, at least 60% by weight resistant starch. The remainder of the composition will be made up of native or modified non-resistant starch, maltodextrin and the like. In one embodiment, the resistant starch composition may contain up to 100% by weight resistant starch.

The resistant starch may be any available resistant starch. It may be a naturally occurring or synthetically produced resistant starch or any chemically modified variants thereof. For example, it may be a Type I, Type II or Type III resistant starch. Preferably, it is a Type III resistant starch.

Methods of synthetically producing Type III resistant starches are known in the art—see for example WO-A-90/15147, EP-A-564893, U.S. Pat. No. 5,281,276, EP-A-0688872 and EP-A-0813817. Briefly, a starting starch material is debranched (e.g. using enzymes such as isoamylase, pullulanase or mixtures thereof) and then retrograded. Preferably, the starting starch material will be a high amylose starch or a maltodextrin. Suitable starch sources include, but are not limited to, pea, potato, wheat, tapioca and maize. Maltodextrin is obtainable, for example, by acid or enzyme catalysed hydrolysis of root or tuber starch. Preferably, the resistant starch used in the process and formulations of the present invention is a resistant starch obtained according to the method described in EP-A-0688872 and EP-A-0813817. Even more preferably, the resistant starch used in the process and formulations of the present invention will be tapioca maltodextrin-derived, Type III resistant starch (such as that sold by Cerestar under the trade name Actistar).

In a first step of the process according to the present invention, the resistant starch composition is dispersed in oil (e.g. by placing the resistant starch and the oil in a receptacle and mixing, manually or mechanically). The oil may be any oil suitable for use in food and/or drink preparations. Preferably, the oil will be a vegetable oil, an animal oil or a mixture of such oils. The following vegetable oils, for example, may be used: canola oil, coconut oil, corn oil, grape seed oil, olive oil, palm oil, peanut oil, rapeseed oil, safflower oil, soya oil, sunflower oil and mixtures of two or more thereof. In a preferred embodiment, the oil will consist of corn oil, rapeseed oil, soya oil, grape seed oil or mixtures of two or more thereof. Suitable animal oils include, for example, fish oils and oils derived from e.g. egg yolk and dairy products. If appropriate, the oil could also or alternatively comprise one or more microbial oils. The oil should preferably contain medium chain fatty acids, especially medium chain triglycerides.

The resistant starch composition is dispersed in the oil such that a resistant starch to oil ratio in the range 1:1 to 1:10 is obtained. Preferably, the ratio will be in the range 1:3 to 1:7. Even more preferably, the ratio will be of approximately 1:5. According to one embodiment, an emulsifier is added to the starch/oil dispersion. Any food grade emulsifier may be used. Lecithin, for example, is suitable. It may be used alone or in combination with other food grade emulsifier(s) such as mono- and diglycerides. The emulsifier may be added in an amount of 0.1 to 10% by weight, preferably in an amount of 0.1 to 5% by weight and even more preferably in an amount of 0.1 to 3% by weight. The emulsifier is added to the starch/oil dispersion before heating.

In a second step of the process according to the present invention, the resistant starch/oil dispersion is heated to a target temperature in the range of 100 to 175° C. In a preferred embodiment, the dispersion is heated to approximately 150° C. Advantageously, heating will be carried out using an indirect heating system whereby the heating medium and the starch/oil dispersion do not come into direct contact. Heating may be in batch (e.g. an oil bath) or continuous (e.g. using HTST—high temperature, short time—equipment with a heat exchanger such as a plate or tubular heat exchanger).

Once heating is completed, and in a third step of the process according to the present invention, the dispersion is cooled. Heating is deemed to be completed once the target temperature has been reached although a standing time of up to 10 minutes, during which the dispersion is maintained at the target temperature, may be foreseen. Preferably, the standing time will be of no more than 3 minutes. Even more preferably, the standing time will be of no more than 10 seconds. According to a preferred embodiment, cooling is initiated immediately upon reaching the target temperature.

The starch/oil dispersion should be cooled to under 90° C. Preferably, it is cooled to approximately 70° C. The dispersion may be cooled artificially (e.g. by refrigeration) or it may be allowed to cool naturally over a period of time. Preferably, the dispersion is cooled rapidly.

Advantageously, during any standing and/or cooling time, aseptic conditions will be maintained so as to preserve the sterility of the heat-treated dispersion. Similarly, packaging of the dispersion into suitable containers should be carried out under aseptic conditions. Suitable containers include, but are not limited to, supple pouch-like containers, sealed cartons, pots, cans, tins, etc. The choice of container will, of course, depend on the ultimate use of the composition. For example, pouch-like containers will be preferred for use in enteral administration.

The process according to the invention is preferably carried out in a continuous production process as illustrated in FIG. 1. Thus, according to one embodiment, the oil and resistant starch compositions are loaded, respectively, to starting tanks 1 and 2. The compositions are then mixed in blending unit 3. The resulting dispersion is subsequently sterilised at sterilisation post 4 (which may be any suitable heating medium as described above). The sterilised product is then packaged at packaging post 5.

It has surprisingly been found that resistant starch sterilised according to this process is not denatured by high temperatures to the same extent as resistant starch sterilised using traditional methods (e.g. in aqueous solutions). Accordingly, in a further aspect of the present invention, there is provided a resistant starch composition sterilised according to the above-described process. This sterilised resistant starch composition can be used in nutritional, pharmaceutical and feed compositions. It could be incorporated, for example, into nutritional or feed compositions (prior to cooking) where it will have improved heat-moisture stability. Such compositions will preferably comprise up to 10% by weight, or more, of the sterilised resistant starch composition of the present invention and one or more additional ingredients (where "sterilised resistant starch composition" refers to the above defined resistant starch composition either still dispersed in oil or completely or partially removed therefrom).

Figure 2:
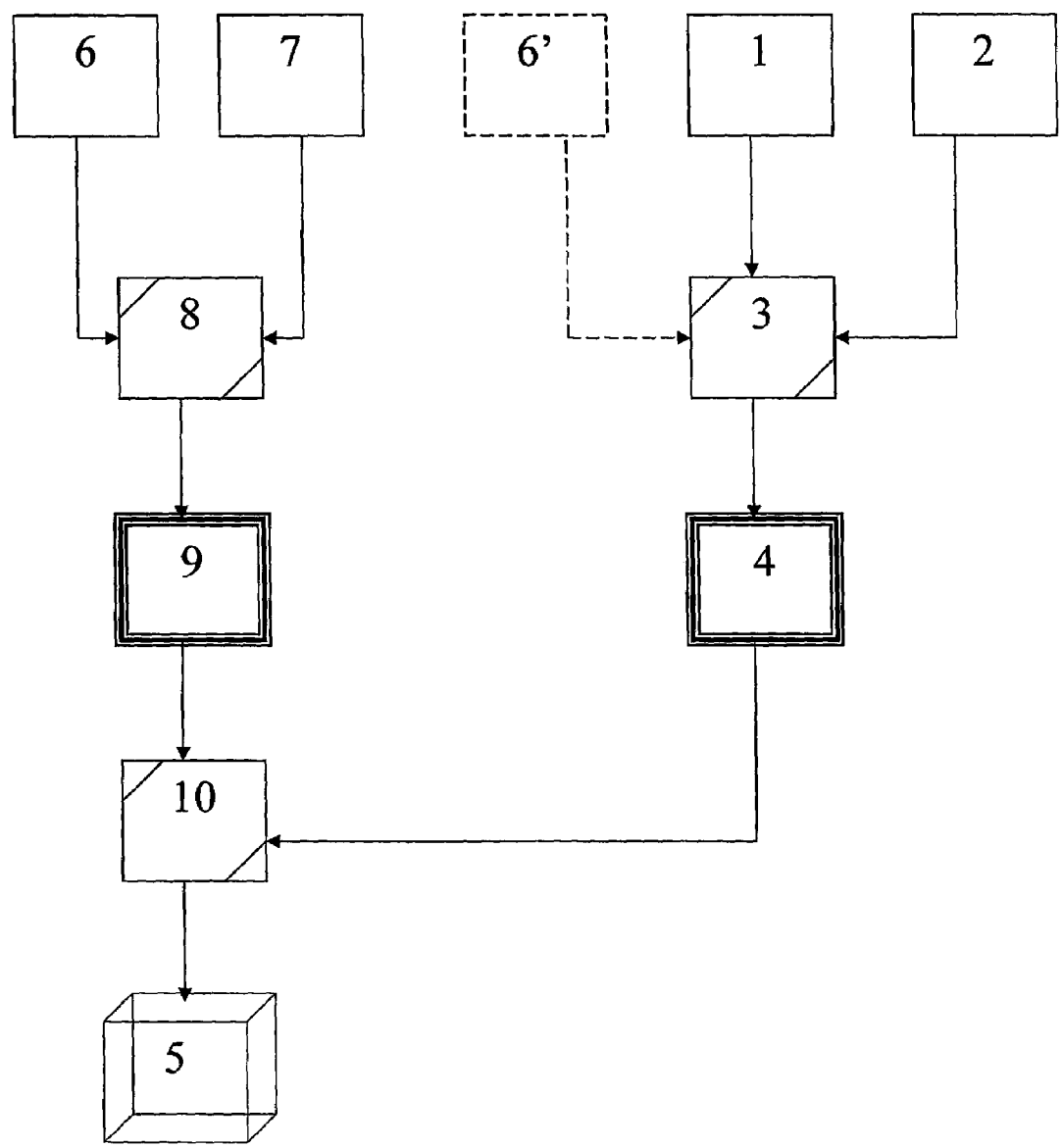
FIG. 2 is a schematic representation of the preparation, in a continuous production process, of a nutritional, pharmaceutical or feed composition according to the present invention wherein (6) and (6') represent further ingredient vessels, (7) represents an optional oil or water vessel, (8) represents an optional further blending unit, (9) represents further sterilisation apparatus and (10) represents a final blending unit.

Any additional ingredients should preferably also be sterilised before being incorporated into the mixture of the present invention. The additional ingredients can either be added after sterilisation of the resistant starch or they can be added to the oil and sterilised together with the resistant starch. If the additional ingredients are to be incorporated post treatment of the resistant starch, they can be sterilised in a separate and/or parallel process (as shown in FIG. 2). This separate process could be any known method (e.g. in an aqueous solution using any direct or indirect UHT method). Of course, if appropriate, some ingredients (especially hydrophobic ingredients) could be sterilised with the resistant starch while others are treated separately. The final composition will eventually be packaged as described above. Accordingly, in a further aspect of the present invention, there is provided a method of producing a sterile nutritional, pharmaceutical or feed composition, said method comprising:

(a) sterilising an oil dispersion comprising resistant starch and, optionally, one or more additional, preferably hydrophobic, ingredients;

(b) sterilising a water solution comprising one or more water-soluble ingredients; and (c) combining the sterilised dispersion of step (a) and the sterilised solution of step (b).

Steps (a) and (b) may be carried out in sequence or substantially simultaneously. The method will preferably be used in a continuous production process such as that illustrated in FIG. 2. The further ingredients (for sterilisation in either oil or water) may include one or more of a protein source, a carbohydrate source (other than the resistant starch), vitamins, minerals, flavourings, colorants and other nutritional additives known to the person skilled in the art. The further ingredients may also include an additional lipid source depending on the extent to which the resistant starch composition has been removed from the oil in which it is sterilised. The lipid source may be selected from any one or more lipids suitable for use in food and/or drink preparations (as defined above).

The proteins may be selected from intact proteins, hydrolysed proteins, peptides, amino acids and mixtures thereof. Suitable sources include vegetable and/or animal proteins. In particular, suitable sources include cereals (such as wheat), soya, pea and milk proteins. Preferably, the protein source will include milk proteins such as casein and lactalbumin which have either been isolated from their source or are added as part of a whole, skimmed or semi-skimmed milk component.

The carbohydrate source may be added as an optional supplement to the resistant starch and will be selected from monosaccharides, disaccharides, oligosaccharides, polysaccharides and mixtures thereof. It may comprise digestible carbohydrates, slowly digestible carbohydrates, indigestible carbohydrates and/or dietary fibre. Examples of suitable carbohydrates include, but are not limited to, glucose (e.g. glucose syrup), maltose, maltodextrin, polysaccharides, inulin and vegetable fibres.

Preferably, the composition will contain, based on its total calorific value, 5-35%, preferably 15-25% protein, 0-60%, preferably 20-40% lipids, and 25-80%, preferably 45-55% carbohydrates.

Advantageously, vitamins (such as vitamins A, D3, E, K1, C, B1, B2, B5, B6, B12 and PP, folic acid and biotin) and/or minerals (such as sodium, potassium, calcium, phosphorus, magnesium, chloride, iron, zinc, copper, manganese, fluorine, chromium, molybdenum, selenium and iodine) can also be added to the composition.

For certain uses, it may also be advantageous to include one or more flavourings (e.g. synthetic or natural flavourings such as vanilla, caramel and/or almond flavourings; fruit juices such as orange, grapefruit, pear, cherry, raspberry and/or blackcurrant juices; vegetable extracts such as tomato, carrot, onion and/or garlic extracts; spices; herbs; etc.) and/or one or more natural or synthetic colorants.

Depending on whether the composition of the present invention is to be used in or as a nutritional, pharmaceutical or feed composition, it will be apparent to one skilled in the art what other ingredients, if any, should be added. These may include, for example, bulking agents, thickeners, stabilisers, sweeteners, carriers, water, water miscible liquids (such as milk, alcohols, etc.) and so on.

Preferably, the composition of the present invention will be used as a nutritional composition. Nutritional compositions may be presented in the form of formulations for enteral administration, as soups, deserts (e.g. dairy-based deserts), drinks (e.g. high energy, hyper-tonic or hyper-proteinated drinks), meal replacement formulations, etc. In a particularly preferred embodiment, the nutritional composition will be in a form suitable for enteral administration (i.e. sterile, nutritionally balanced and having a suitable viscosity). Enteral administration is usually employed to provide nutrition to individuals not able to feed themselves, e.g. those in poor health and/or those undergoing (or having undergone) treatment or surgery.

The nutritional make-up of the compositions according to the present invention will be determined depending on the individuals to which they are to be administered. For example, they may be adapted for administration to hypercatabolic individuals having increased protein and/or energy needs (e.g. severely undernourished or elderly individuals, cancer patients, patients with slowly healing wounds or bedsores); to individuals suffering from metabolic problems (such as transitory glucose intolerance, diabetes or pancreatic endocrine insufficiency, obesity, etc.); to severely ill individuals (e.g. individuals suffering from Aids, cancer or Crohn's disease); or to individuals with respiratory problems (e.g. patients requiring artificial ventilation or with chronic asthma). The necessary adaptations will be obvious to a person skilled in the art.

Because of its ability to stimulate the production of beneficial short chain fatty acids such as butyrate, the sterilised resistant starch composition of the present invention may also be used as an active ingredient in pharmaceutical compositions. Such compositions will be of use in the treatment of intestinal problems including conditions associated with inflammation of the gastrointestinal tract (such as ulcerative colitis, Crohn's disease and inflammatory bowel disease), digestive disorders (such as irritable bowel syndrome, constipation, diarrhoea, impaired gut barrier function, bacterial translocations and impaired mucus layer formation and function), colon cancers, diabetes (especially type 2 diabetes), obesity and other health disorders related to digestion and to the metabolism of carbohydrates.

As would be apparent to a person skilled in the art, the pharmaceutical compositions according to the invention may also contain further active ingredients suitable for treatment of the targeted disease or condition.

The invention will now be illustrated by the following, non-limiting example.

EXAMPLE 1

Sterilisation of Resistant Starch Composition

A solution of Actistar in oil was prepared in order to measure the quantity of resistant starch present in the oil blend after heat treatment.

The blend was prepared by pouring and mixing 120 g of Actistar™ into 300 g of oil in a beaker.

The blend was then poured into a reactor with the following conditions:

Heating system (oil bath) set at 165° C. in order to reach a final temperature of 150° C.

Rotation rate: 80 rpm.

The solution was heated until it reached a temperature of 150° C. This took approximately 50 minutes. The hot solution was then immediately cooled by being poured into an Inox beaker, which was placed on ice.

Samples of the blend were analyzed to check the heat stability of Actistar™ when dispersed in oil. The analysis showed that resistant starch recovery was 100%. This result demonstrates a very good resistant starch stability when heated in an oil blend.

EXAMPLE 2

Comparative Example

A number of Actistar and milk blends were prepared in order to measure the quantity of resistant starch present after heat treatment.

For each blend, 30 g of Actistar™ were added to 1 liter of whole milk. Additional ingredients included sucrose, vanilla flavor or cocoa powder and a stabilizer (stabilizer 1=carrageenan; stabilizer 2=CMC+carrageenan). The dry ingredients were dispersed in the milk using a Silversonn pilot mixer.

The dispersions were preheated to 70° C. and homogenized at either 50 or 220 bars. They then underwent UHT treatment (using a plate heat exchanger) at 137° C. for 6 seconds. After UHT treatment, the mix was cooled to 25° C. (using cooling plates).

Samples of the blend were analyzed to check the heat stability of Actistar™ when dispersed in milk (using the Saura-Calixto Method—Food Chem. Vol 56, no. 4, 1996, pp. 445-449). The following results were obtained:

| Flavor | Stabiliser | Homogenisation (bars) | Resistant Starch recovery (%) |
|---|---|---|---|
| Vanilla | 1 | 50 | 47 |
| Vanilla | 1 | 220 | 47 |
| Chocolate | 1 | 50 | 51 |
| Chocolate | 2 | 50 | 50 |
| Chocolate | 2 | 220 | 48 |

As can be seen above, resistant starch recovery varied from 47 to 51%. In other words, approximately half the resistant starch content of UHT-treated milk compositions is lost.

The invention claimed is:

1. Process for sterilising a resistant starch composition characterised in that it comprises the steps of:
   (a) dispersing said resistant starch composition in oil;
   (b) heating the starch/oil dispersion obtained in step (a) to a target temperature of 100 to 175° C.; and
   (c) cooling the starch/oil dispersion,
   provided that if the resistant starch composition is granulated potato starch, the oil will be other than rapeseed oil.

2. Process according to claim 1, characterised in that step (c) is carried out immediately upon reaching the target temperature of step (b).

3. Process according to claim 1, characterised in that the resistant starch composition comprises at least 25% by weight resistant starch.

4. Process according to claim 1, characterised in that the resistant starch is maltodextrin-derived resistant starch.

5. Process according to claim 1, characterised in that the oil is selected from one or more vegetable oils, animal oils and mixtures thereof.

6. Process according to claim 5, characterised in that the oil is selected from a group consisting of: canola oil, coconut oil, corn oil, grape seed oil, olive oil, palm oil, peanut oil, rapeseed oil, safflower oil, soy oil, sunflower oil and mixtures thereof.

7. Process according to claim 1, characterised in that the starch/oil dispersion contains one part resistant starch for 3-7 parts oil.

8. Process according to claim 7, characterized in that the starch/oil dispersion contains one part resistant starch for about 5 parts oil.

9. Process according to claim 1, characterised in that an emulsifier is added to the starch/oil dispersion before heating.

10. Sterilised resistant starch composition obtainable by the process of claim 1.

11. Use of the sterilised resistant starch composition of claim 10 in a nutritional, pharmaceutical or feed composition.

12. Nutritional, pharmaceutical or feed composition comprising up to 10% by weight of the sterilised resistant starch composition of claim 10, and one or more additional ingredients.

13. Nutritional, pharmaceutical or feed composition according to claim 12, characterised in that the one or more additional ingredients include nutrients selected from the group consisting of
   a source of protein selected from intact proteins, hydrolysed proteins, peptides, amino acids and mixtures thereof;
   a source of carbohydrate;
   a source of vitamins and/or minerals;
   flavourings and/or colorants;
   water and/or water miscible liquids.

14. Nutritional, pharmaceutical or feed composition according to claim 13, characterized in that the source of protein is derived from milk, pea, cereals and/or soya.

15. Nutritional, pharmaceutical or feed composition according to claim 12, characterised in that it is suitable for enteral administration.

16. The process of claim 1, wherein said target temperature is about 150° C.

17. The process of claim 1, wherein said resistant starch composition comprises at least 50% by weight resistant starch.

18. The process of claim 1, wherein said resistant starch composition comprises at least 60% by weight resistant starch.

19. Method of producing a sterile nutritional, pharmaceutical or feed composition, characterised in that it comprises the steps of:
   (a) sterilising an oil dispersion comprising resistant starch and, optionally, one or more additional ingredients;
   (b) sterilising a water solution comprising one or more water-soluble ingredients; and
   (c) combining the sterilised dispersion of step (a) and the sterilised solution of step (b), provided that if the oil dispersion of step (a) is rapeseed oil dispersion, the resistant starch will be other than granulated potato resistant starch.

20. Method according to claim 19, characterised in that steps (a) and (b) are carried out substantially simultaneously.

21. Method according to claim 19, further comprising a filling step (d) wherein the sterile nutritional, pharmaceutical or feed composition is aseptically packaged.

22. Method according to claim 19, characterised in that the oil used in the oil dispersion is selected from one or more vegetable oils, animal oils and mixtures thereof.

23. Method according to claim 22, characterised in that the oil is selected from a group consisting of: canola oil, coconut oil, corn oil, grape seed oil, olive oil, palm oil, peanut oil, rapeseed oil, safflower oil, soy oil, sunflower oil and mixtures thereof.

24. Method according to claim 19, characterised in that the oil dispersion contains one part resistant starch for 3-7 parts oil.

25. Method according to claim 24 characterised in that the oil dispersion contains one part resistant starch for about 5 parts oil.

26. Method according to claim 19, characterised in that the oil dispersion comprises an emulsifier.

27. Method according to claim 19, characterised in that the sterile nutritional, pharmaceutical or feed composition produced comprises up to 1000 by weight resistant starch.

28. Method according to claim 19, characterised in that the sterile nutritional, pharmaceutical or feed composition produced is suitable for enteral administration.

29. Method according to claim 19, characterized in that the one or more water-soluble ingredients of step (b) include nutrients selected from the group consisting of:
   a source of protein selected from the intact proteins, hydrolysed proteins, amino acids and mixtures thereof;
   a source of carbohydrate;
   a source of vitamins and/or minerals;
   flavourings and/or colorants.

30. Method according to claim 29, characterised in that the source of protein is derived from milk, pea, cereals and or soya.

31. A pharmaceutical composition for use in the treatment of intestinal problems including conditions associated with inflammation of the gastrointestinal tract, digestive disorders, colon cancers, diabetes and obesity, comprising the sterilised resistant starch composition of claim 10 and a suitable carrier.

* * * * *

UNITED STATES PATENT AND TRADEMARK OFFICE
CERTIFICATE OF CORRECTION

PATENT NO.       : 7,682,642 B2                                Page 1 of 1
APPLICATION NO.  : 10/561296
DATED            : March 23, 2010
INVENTOR(S)      : Jacques Georges Denis Cenere Simon It is certified that error appears in the above-identified patent and that said Letters Patent is hereby corrected as shown below:

Column 10, line 55 (Claim 27), please delete "1000" and insert --10%-- therefor.

Signed and Sealed this

Fifteenth Day of June, 2010

David J. Kappos
*Director of the United States Patent and Trademark Office*